United States Patent [19] [11] 4,082,526
Estes et al. [45] Apr. 4, 1978

[54] METHOD OF APPLYING POWDER TO A GLASS RIBBON

[75] Inventors: Ronald L. Estes; Larry S. McGee, both of Carlisle; Sanford M. Welton, Mount Holly Springs, all of Pa.

[73] Assignee: PPG Industries, Inc., Pittsburgh, Pa.

[21] Appl. No.: 728,367

[22] Filed: Sep. 30, 1976

[51] Int. Cl.² ............................................. C03B 33/00
[52] U.S. Cl. ........................................ 65/24; 65/60 B; 65/97; 225/2
[58] Field of Search ............... 65/24, 26, 60 B, 97, 65/175, 169; 225/2

[56] References Cited
U.S. PATENT DOCUMENTS 2,476,145  7/1949  Gwyn et al. ........................ 206/62
2,824,411  2/1958  Goodwillie et al. ................ 65/60 B
3,876,410  4/1975  Scholes ............................. 65/60 B X
3,907,127  9/1975  Bollinger et al. ................. 214/6 DS Primary Examiner—Arthur D. Kellogg
Attorney, Agent, or Firm—Donald Carl Lepiane

[57] ABSTRACT

A powder is applied to a glass ribbon as the ribbon is displaced between an annealing lehr and a cutting station. The powder on the ribbon facilitates removal of glass chips (1) generated during the cutting of the ribbon into sheets and (2) projected onto the top surface of the glass ribbon. The powder is applied by vaporizing same in a chamber and condensing the vaporized powder on or allowing the powder to condense in the chamber and fall on the top surface of the ribbon as it is displaced past the chamber.

9 Claims, 3 Drawing Figures

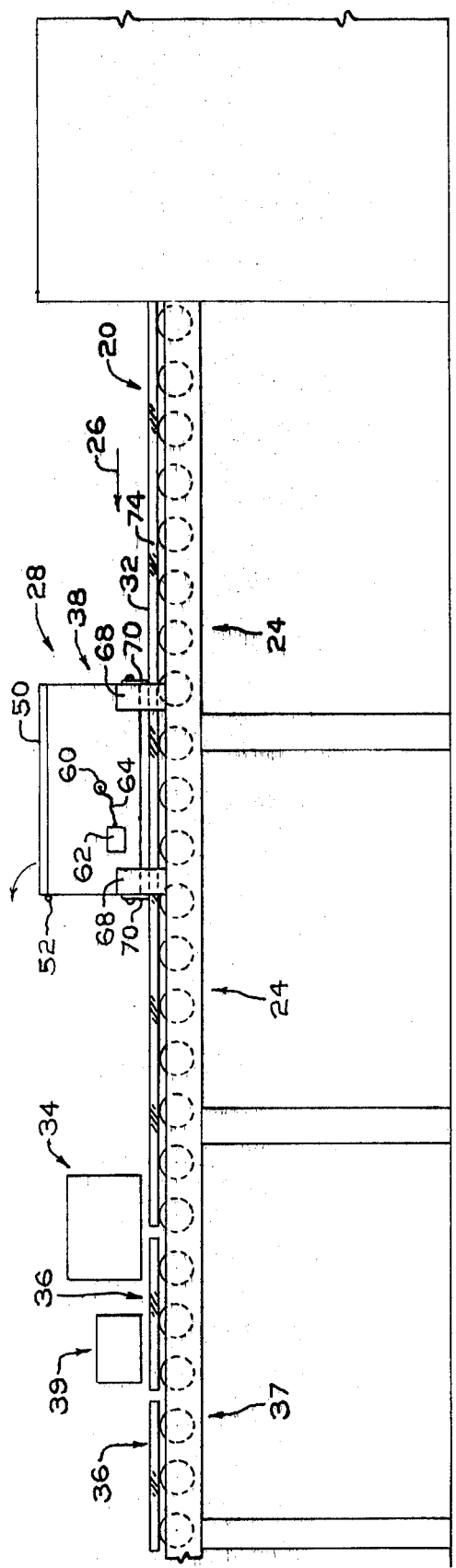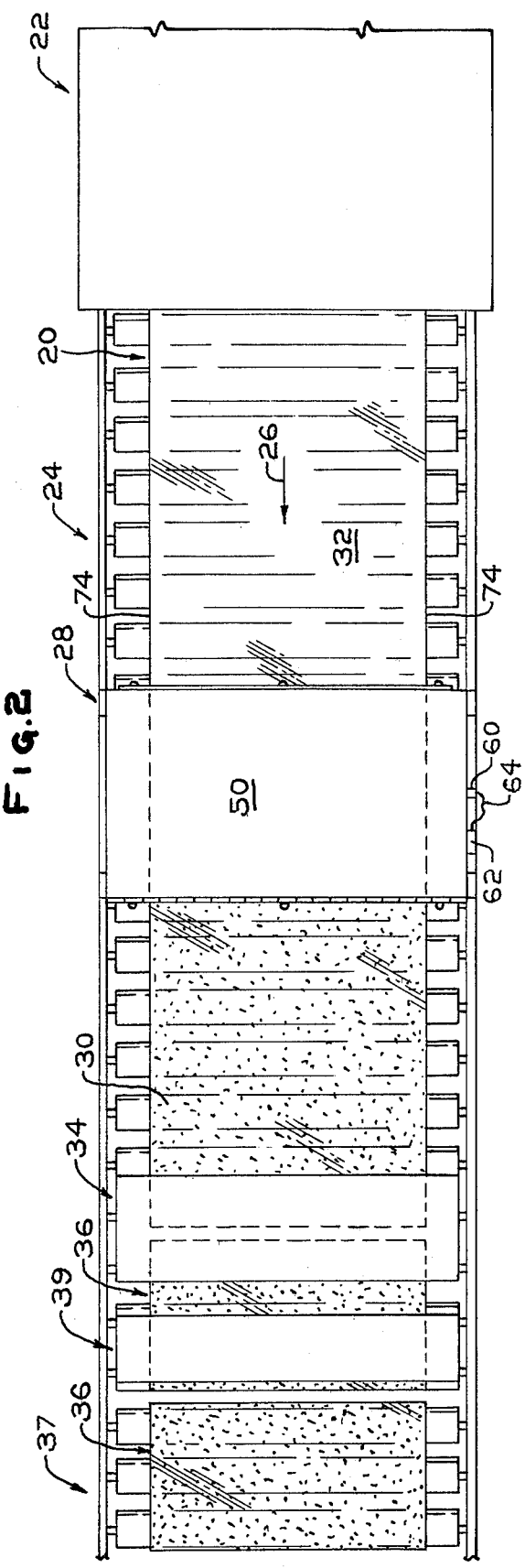

METHOD OF APPLYING POWDER TO A GLASS RIBBON

BACKGROUND OF THE INVENTION

1. Field of the Invention

This invention relates to a method of and applicator for applying powder to a glass ribbon to facilitate removal of glass chips from the glass ribbon surface.

2. Discussion of the Problem

A glass ribbon exiting from an annealing lehr is advanced through a cutting station where the ribbon is cut into glass sheets of selected lengths. Thereafter the sheets are further cut into smaller pieces.

The cutting operation, in general, includes scoring the glass ribbon and subsequently snapping the glass ribbon along the score line. It has been found that during snapping, glass chips are propelled over and onto the glass surface.

These chips adhere to the glass surface by surface tension and are difficult, if not impossible, to remove. If these glass chips are not removed, they scratch the glass surfaces when the sheets are packed for shipment and/or storage.

It would be advantageous, therefore, to provide a procedure for preventing glass chips generated during cutting from adhering to the glass surface.

SUMMARY OF THE INVENTION

This invention relates to a method of applying a powder to a substrate, e.g., a glass ribbon exiting from an annealing lehr and moving toward a cutting station. A powdered material, e.g., adipic acid, is vaporized in an applicator to provide an atmosphere having the powder therein. The glass ribbon and applicator are moved relative to one another while the powder in the atmosphere is deposited on the glass ribbon.

This invention also relates to an improved apparatus for cutting a substrate of a refractory material selected from the group consisting of glasses, ceramics and glass ceramics, e.g., a glass ribbon. The cutting apparatus includes scoring facilities to provide a fracture in the glass ribbon and facilities to stress the fracture to open same. The improvement includes container facilities having facilities therein for vaporizing a powder. Facilities are provided for displacing the container facilities and the glass ribbon relative to one another.

BRIEF DESCRIPTION OF THE DRAWING

FIG. 1 is a side elevated view of a conveying system for advancing a glass sheet form an annealing lehr past a powder applicator incorporating features of the invention toward a cutting station;

FIG. 2 is a top view of the conveying system shown in FIG. 1; and

DESCRIPTION OF THE INVENTION

Figure 3:
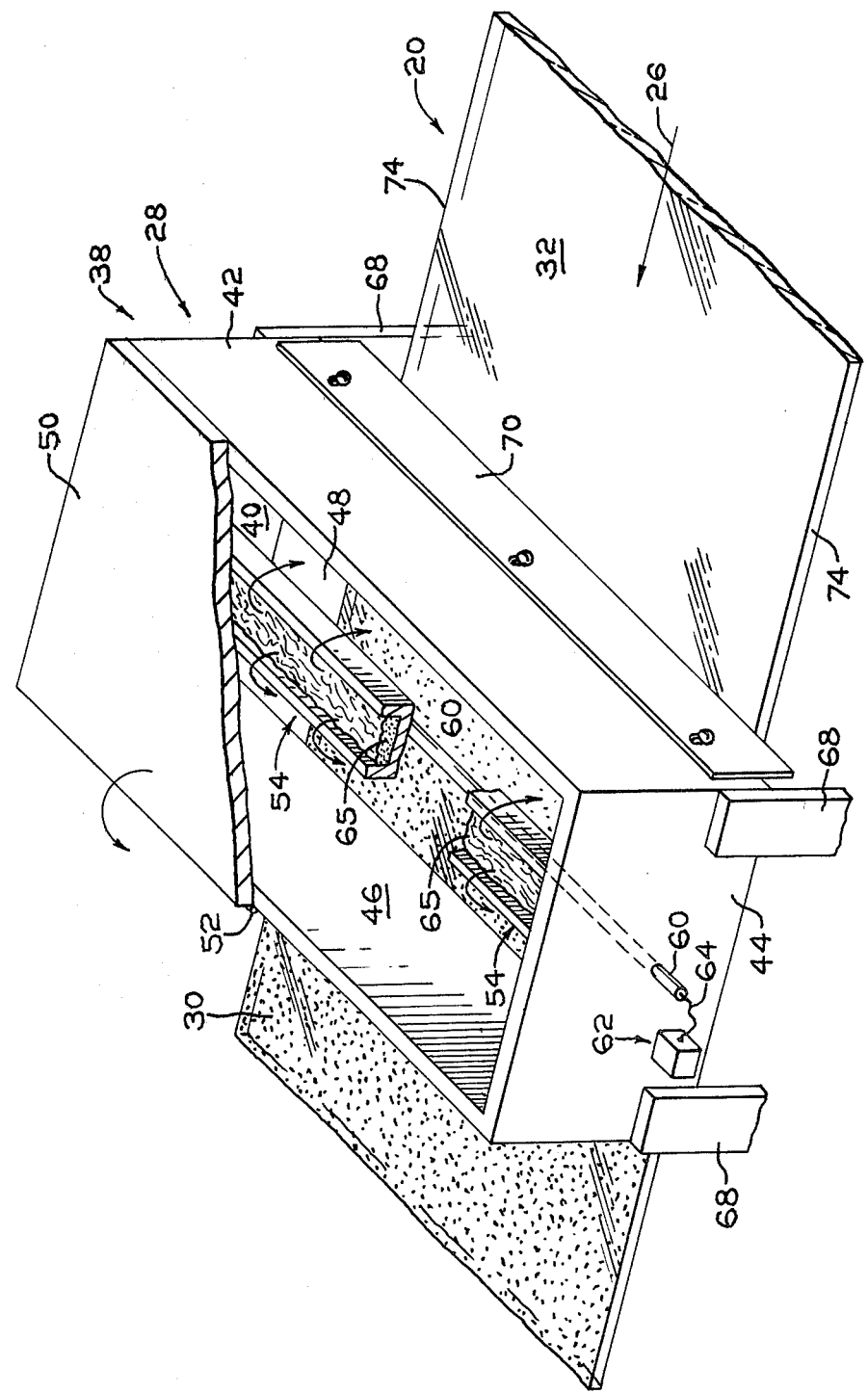
FIG. 3 is an isometric view of the applicator incorporating features of the invention and having portions removed for purposes of clarity.

Referring to FIGS. 1 and 2, annealed glass ribbon 20 exiting from annealing lehr 22 is displaced by conveyor 24 along an article movement path, designated by the arrow 26, past powder applicator 28 incorporating features of the invention. As the glass ribbon 20 advances past the applicator 28, a layer of powdered material 30 (shown in FIGS. 2 and 3) is applied to the upper surface 32 of the glass ribbon 20 in a manner to be discussed below. The glass ribbon 20 is further advanced by the conveyor 24 from the applicator 28 through a cutting station 34 where the ribbon 20 is scored and snapped to provide glass sheets 36.

The glass sheets 36 are advanced downstream of the cutting station 34 by conveyor 37 at a linear speed greater than the linear speed of the glass ribbon 20 to pull a gap between the glass sheets 36.

As will become apparent, the invention is not limited to the apparatus or method for forming the glass ribbon. For example, but not limiting thereto, the glass ribbon may be formed in accordance to the teachings of U.S. Pat. Nos. 3,843,346 and 3,220,816 which teachings are hereby incorporated by reference. Further the glass ribbon 20 and glass sheets 36 may be displaced along the path 26 in any conventional manner. Still further, the glass ribbon 20 may be cut into sheets 36 in any conventional manner, e.g., for example, but not limiting to, the method and apparatus taught in U.S. Pat. Nos. 3,244,337; 3,142,427; and 2,834,156 which teachings are hereby incorporated by reference.

As the ribbon 20 is snapped along the score, glass chips (not shown) are projected over and onto the powder 30 on the top surface 32 of the sheets 36 and glass ribbon 20. The powder 30 prevents the glass chips from sticking to the glass surface 32 by surface tension.

The chips on the glass sheets 36 and/or glass ribbon 20 may be removed in any conventional manner, e.g., by an air knife or by a brush. Preferably the chips are removed prior to packing the glass sheets 36 for shipment and/or storage. For example, if the glass sheets 36 are to be packed, the glass chips may be removed from the glass sheets by an air knife 39 mounted adjacent to and downstream of the cutting station 34. On the other hand, if the glass sheets 36 are to be subdivided into glass pieces (not shown), the chips are preferably removed from the glass pieces prior to packing same.

Referring to FIGS. 1 and 3, and more specifically to FIG. 3, the applicator 28 of the invention includes a housing 38 having joined sidewalls 40, 42, 44 and 46; an open bottom 48 and a lid 50 pivotally mounted to a sidewall, e.g., sidewall 46 at 52 to provide access to the interior of the housing 38. A trough 54 having its opposed ends secured to opposed sidewalls of the housing, e.g., sidewalls 40 and 44, respectively, is above and transverse to the article movement path 26 as shown in FIG. 3. An electrical heating element 60 is mounted below the trough and advantageously connected to a current supply 62 by way of wire 64 for vaporizing powder 65 in the trough 54.

The powdered material 65 in the trough is heated by the element 60 to its vaporization temperature. The vaporized powder condenses on the surface 32 or condenses in the housing 38 and falls on the surface 32 of the glass ribbon 20. The powder preferably used in the practice of the invention is (1) one that does not stain the glass and (2) easily removable, e.g., by water. Types of powder that may be used in the practice of the invention but not limiting thereto are adipic acid, benzoic acid, and salicylic acid.

The temperature of the glass ribbon at the position of powder application is preferably less than the vaporization temperature of the powder in order that the vaporized powder condenses or falls on the glass ribbon surface 32. For example, adipic acid has a vaporization temperature of about 510° F. (263° C.) and the temperature of the glass ribbon is preferably less than about 500° F. (260° C.) when the powder is applied; benzoic acid has a vaporization temperature of about 470° F. (249° C.) and the temperature of the glass ribbon is preferably less than about 460° F. (240° C.) when the powder is applied; salicylic acid has a vaporization temperature of about 410° F. (211° C.) and the temperature of the glass ribbon is preferably less than about 400° F. (200° C.) when the powder is applied.

In general, the temperature of the ribbon at the exit end of the annealing lehr 22 is about 200° F. (95° C.) and about 190° F. (86° C.); 3 feet (0.9 meter) downstream of the exit end of the lehr 22.

The applicator 28, when using the above-mentioned powders, may, therefore, be positioned above the glass ribbon at any selected position downstream of the lehr 22 and upstream of the cutting station 34.

As can now be appreciated, the invention is not limited to the dimensions of the housing 38 nor of the trough 54. However, it is recommended that the interior of the housing 38 be sized so that the atmosphere within the interior becomes saturated with the vaporized powder in a short time period. In this manner, the powder may be applied to the surface 32 of the glass ribbon 20 shortly after the heating element 60 is energized. The size of the trough is selected depending on the quantity of powder to be contained. Further, the housing 38 may be made of any rigid material, e.g., wood or metal. If desired, the housing may be insulated to minimize conduction and convection heat losses.

In the practice of the invention, the applicator 28 is mounted above and transverse to the glass ribbon by structural members 68 as shown in FIGS. 1 and 3. Curtains 70 are mounted on the sides 42 and 46 of the housing 38 as shown in FIGS. 1 and 3 to contain the vaporized powder or falling powder about a predetermined section of the ribbon.

As can now be appreciated, other embodiments with the scope of the invention can be made. For example, the applicator 28 may be moved relative to the glass ribbon. Further, the invention may be practiced on glass sheets. Still further, the invention may be practiced when cutting other refractory materials, e.g., ceramics or glass-ceramics.

DETAILED DESCRIPTION OF THE INVENTION

Referring to FIGS. 1 and 2, powder applicator 28 incorporating features of the invention is mounted above conveyor 24, downstream of annealing lehr 22 and upstream of cutting station 34.

The annealing lehr 22 is of the type used in the manufacture of float glass ribbon to remove stress in the glass ribbon.

The conveyor 24 is of the type used in the art to advance the glass ribbon from the annealing lehr 22 toward the cutting station 34.

The cutting station 34 is of the type used in the art to score the glass ribbon 20 between its edges 74 and apply a bending moment to open the score and cut the glass ribbon into glass sheets 36.

The glass sheets 36 are advanced by conveyor 37 from the cutting station 34 past an air knife 39 of the type used in the art. The glass sheets 36 are advanced by the conveyor 37 at a linear speed greater than the linear speed of the glass ribbon 20 to pull a gap between the sheets 36.

With reference to FIG. 3, the applicator 28 is made of wood and includes sidewalls 40, 42, 44 and 46 joined together to form a rectangular housing 38. The housing has a wall thickness of about ½ inch (1.27 centimeters); a length of about 160 inches (4 meters); a width of about 12 inches (0.3 meter) and a height of about 12 inches (0.3 meter).

A lid 50 having dimensions of about 160 inches (4 meters) by about 12 inches (0.3 meter) and about ½ inch thick (1.27 centimeters) is pivotally mounted to the sidewall 46 of the housing 38 by hinge 52.

An aluminum trough 54 having a U-shaped cross-sectional configuration has its ends mounted to the sidewalls 40 and 44, respectively, of the housing 38. The trough 54 has a wall thickness of ½ inch (1.27 centimeters); a height of about 3 inches (7.62 centimeters) and a width of about 6 inches (15.24 centimeters). The open bottom 48 of the trough 54 is spaced about 7 inches (17.78 centimeters) from the glass ribbon surface 32 as shown in FIG. 1.

A resistance heater 60 is mounted under the trough and connected to a powder supply 62 by wire 64.

The applicator 28 is mounted above the conveyor 24 and transverse to the glass ribbon path 26 by structural members 68 as shown in FIG. 1. Drapes 70 mounted on sides 42 and 46 of the housing lay on ribbon surface 32. The position of the application is at a point where the ribbon has a temperature of about 100° F. (40° C.).

The trough 54 is filled with adipic acid, the lid closed and the heater energized to a temperature of about 525° F. (265° C.) to vaporize the adipic acid.

The glass ribbon 20 exiting from the annealing lehr 22 is conveyed past the applicator 28. As the glass ribbon is displaced past the applicator, the adipic acid condenses on the ribbon surface 32 or condenses in the applicator and falls on the ribbon surface 32 and is shown as numeral 30. The glass ribbon is further displaced downstream through the cutting station 34 where the glass ribbon is scored between opposed sides 74 and subsequently snapped.

Chips generated during snapping are propelled over the glass ribbon surface 32 and lay on the adipic acid 30. The sheets 36 are thereafter displced downstream of the cutting station 34 by the conveyor 37 where the chips are removed by the air knife 39.

As can be appreciated, the invention is not limited to the above example which is presented for illustration purposes only.

What is claimed is:

1. A method of applying a temporary protective layer of a powder to a sheet of a refractory material selected from the group consisting of glasses, ceramics and glass-ceramics, said powder being selected from the group consisting of adipic acid, benzoic acid, salicylic acid or mixture thereof, comprising the steps of:
    vaporizing the powder in an applicator to produce an atmosphere comprising vaporized powder or a mixture of vaporized powder and powder; and
    exposing a surface of the sheet to the atmosphere in the applicator for a time sufficient to deposit a temporary protective layer of powder from the atmosphere thereupon.

2. The method as set forth in claim 1 wherein said exposing step includes the step of condensing the vaporized powder in the atmosphere of the applicator to a powder.

3. The method as set forth in claim 1 wherein said exposing step includes the step of condensing the vaporized powder in the atmosphere on the substrate.

4. In a method of cutting a glass sheet wherein the method includes the steps of advancing the glass sheet through a cutting station; scoring the glass sheet at the cutting station to provide a score line in the glass sheet; and applying a bending moment about the score line at the cutting station to sever the glass sheet wherein chips generated during said bending moment applying step are projected upward and fall on at least one surface of the glass sheet and adhere thereto by surface tension, the improvement comprising:

vaporizing a powder selected from the group consisting of adipic acid, benzoic acid, salicylic acid or mixtures thereof in an applicator to produce an atmosphere comprising vaporized powder or a mixture of vaporized powder and powder; and exposing the at least one surface of the glass sheet to the atmosphere in the applicator before practicing said bending moment applying step for a time sufficient to deposit a temporary protective layer of powder from the atmosphere thereupon wherein the chips generated during said bending moment applying step fall on the temperary protective layer of powder to prevent the chips from adhering to the at least one surface of the glass sheet.

5. The method as set forth in claim 4 wherein the glass sheet is a glass ribbon and further including the steps of advancing the glass ribbon from an annealing lehr toward the cutting station and practicing said depositing step between the annealing lehr and the cutting station.

6. The method as set forth in claim 5 wherein the temperature of the glass ribbon during the practice of said exposing step is less than the vaporization temperature of the powder.

7. The method as set forth in claim 6 wherein said exposing step includes the step of condensing the vaporized powder in the atmosphere on the surface of the glass ribbon.

8. The method as set forth in claim 6 wherein said exposing step includes the step of condensing the vaporized powder in the atmosphere of the applicator to a powder.

9. The method as set forth in claim 4 wherein the glass sheet is advanced along a predetermined path lying in a generally horizontal plane and the chips generated during said bending moment applying step fall on the upper surface of the glass sheet.

* * * * *